United States Patent [19]
Murata et al.

[11] Patent Number: 5,456,343
[45] Date of Patent: Oct. 10, 1995

[54] WET TYPE CLUTCH

[75] Inventors: Kiyohito Murata; Shogo Matsumoto, all of Susono, Japan

[73] Assignee: Toyota Jidosha Kabushiki Kaisha, Toyota, Japan

[21] Appl. No.: 220,709

[22] Filed: Mar. 31, 1994

[30] Foreign Application Priority Data

Apr. 13, 1993 [JP] Japan ................................. 5-110086
Jan. 14, 1994 [JP] Japan ................................. 6-015978

[51] Int. Cl.⁶ .................................................. F16D 33/18
[52] U.S. Cl. .................. 192/3.29; 192/3.28; 192/107 R; 192/107 M
[58] Field of Search ............................. 192/3.29, 3.28, 192/3.3, 107 R, 107 M

[56] References Cited

U.S. PATENT DOCUMENTS

| | | | |
|---|---|---|---|
| 4,240,532 | 12/1980 | Blomquist . | |
| 4,305,494 | 12/1981 | Ishida et al. | 192/107 M |
| 4,382,496 | 5/1983 | Yamamori et al. . | |
| 4,445,599 | 5/1984 | Bopp | 192/3.29 |
| 4,926,988 | 5/1990 | Kundermann . | |
| 4,930,608 | 6/1990 | Schenk et al. | 192/3.29 |
| 4,969,543 | 11/1990 | MacDonald | 192/3.29 |
| 4,986,397 | 1/1991 | Vierk | 192/107 R X |
| 5,056,631 | 10/1991 | MacDonald | 192/3.29 |
| 5,065,853 | 11/1991 | Fujimoto et al. . | |
| 5,103,947 | 4/1992 | Okuzumi . | |
| 5,174,423 | 12/1992 | Tsukamoto et al. . | |
| 5,241,820 | 9/1993 | Fukunaga et al. . | |

FOREIGN PATENT DOCUMENTS

| | | | |
|---|---|---|---|
| 0389794 | 10/1990 | European Pat. Off. . | |
| 533426 | 3/1993 | European Pat. Off. | 192/3.29 |
| 2102963 | 4/1990 | Japan . | |
| 4-191552 | 7/1992 | Japan | 192/3.29 |
| 4300447 | 10/1992 | Japan . | |
| 5-272615 | 10/1993 | Japan | 192/3.29 |
| 2118643 | 11/1983 | United Kingdom . | |

*Primary Examiner*—Andrea L. Pitts
*Attorney, Agent, or Firm*—Oblon, Spivak, McClelland, Maier & Neustadt

[57] ABSTRACT

A wet type clutch which has its piston moved by the difference of the pressure in two oil chambers at the two sides of the piston while shutting the communication between the two oil chambers with a friction member adhered to either of the piston or a front cover to be engaged by the piston. An annular groove for communicating with such one of the two oil chambers as will take a lower pressure when the clutch is applied is formed in the surface, to which the friction member is adhered, and/or the adhered surface of the friction member itself, to reduce the pressure acting to return the piston. A seal or high porosity material may also be used to reduce the oil pressure acting on the piston.

19 Claims, 10 Drawing Sheets

WET TYPE CLUTCH

BACKGROUND OF THE INVENTION

The present invention relates to a wet type clutch to be actuated by a hydraulic pressure.

This kind of clutch is made to effect torque transmission by bring a friction member and a frictional surface facing the friction member into facial contact with each other. In a known torque transmission system for forcing the friction member and the frictional surface to contact, the friction member is adhered to either a piston or the surface facing the piston, and the frictional surface is exemplified by the surface facing the friction member, so that the piston is moved forward to engage with that surface. In this system, the piston itself acts as a torque transmission member, as exemplified in a lockup clutch of a torque converter.

FIGS. 16 and 17 show a torque converter 1 which is equipped with a lockup clutch of the prior art. This torque converter 1 has its entirety defined liquid-tight by a front cover 2 and a shell 3a of the pump impeller 3 and is filled up with a fluid. The torque converter 1 is arranged with a turbine runner 4, a stator 5, and a piston 6 of the lockup clutch. To such a surface of the piston 6 as is located at the circumferential edge portion and faces the inner surface of the front cover 2, there is adhered a porous friction member 7 which is formed into an annular shape having a constant width. Across this piston 6, there are formed a first oil chamber 8 at the side of the front cover 2 and a second oil chamber 9 at the side of the turbine runner 4. In case the lockup clutch is to be applied, the fluid is fed to the second oil chamber 9 and discharged from the first oil chamber 8. As a result, the internal pressure in the second oil chamber 9 exceeds that in the first oil chamber 8 so that the piston 6 is pushed toward the front cover 2 to bring its friction member 7 into contact with the front cover 2 as a countermember while shutting the communication between the first oil chamber 8 and the second oil chamber 9 by that friction member 7. As a result, leakage of the fluid from the second oil chamber 9 to the first oil chamber 8 is substantially eliminated to establish a large pressure difference between the two oil chambers 8 and 9 so that the friction member 7 of the piston 6 is pushed to contact with the front cover 2. In other words, the lockup clutch is applied to transmit the torque of the engine directly to the (not-shown) input shaft of the gear transmission mechanism from the front cover 2 through the piston 6.

As in the lockup clutch described above, however, the wet type clutch, which is to be applied by shutting the communication between the higher pressure oil chamber and the lower pressure oil chamber with the friction member and the frictional surface, has a tendency to be given a lower torque capacity for the fed oil pressure than that of the ordinary wet type clutch, in which clutch discs and clutch plates alternately arranged are pushed by a piston. Specifically, such lockup clutch as in the prior art is constructed such that the porous friction member 7 is used and impregnated with the fluid. As a result, the higher pressure of the second oil chamber 9 at the time of applying the clutch propagates to the fluid in the friction member 7, too. This pressure applied to the portion of the friction member 7 acts in the direction to move the piston 6 away from the front cover 2 thereby to reduce the force to applying the clutch.

More specifically, the force acting to move the piston 6 apart from the front cover 2 takes a higher level (as will be called the "apply pressure"), as seen from FIG. 17, at the portion of the friction member 7 contacting with the second oil chamber 9 having a higher pressure and gradually takes the lower level as goes away from the second oil chamber 9, until it takes substantially the same level (as will be called the "drain pressure") as that in the first oil pressure 8 at the portion contacting with the first oil chamber having a lower pressure. The so-called "sum of reactions", as is distributed due to the porous material of the friction member 7, lowers the force to apply the clutch so that the apparent coefficient $\mu$ of friction of the friction member 7 drops to reduce the torque capacity.

In order to increase this torque capacity, it is conceivable to increase the size of the clutch or to raise the oil pressure for applying the clutch. The large-sized clutch will cause problems that its mountability on a vehicle becomes poor and that its responsiveness to the operation is deteriorated. On the other hand, the rise in the oil pressure for the clutch application will increase the deformation of the shell or the like of the torque converter to cause another problem that an offset contact with the clutch surface occurs.

SUMMARY OF THE INVENTION

A main object of the present invention is to raise the clutch applying force to increase the torque transmission capacity of the clutch without any rise in the oil pressure to be fed to apply the clutch.

Another object of the present invention is to shutting the propagation of the oil pressure through the porous friction member, which is provided for disconnecting the feed and discharge sides of the oil pressure, to lower the pressure acting in the direction to release the clutch.

Still another object of the present invention is to minimize the range of propagation of the oil pressure through the porous friction member between the feed and discharge sides to lower the pressure acting in the direction to release the clutch.

A further object of the present invention is to minimize the propagation of the oil pressure through the friction member by using a friction member having its porosity rate changed.

In a wet type clutch according to the present invention, a piston is arranged to move back and forth with respect to a countermember surface facing the piston, and a porous friction member is adhered to either the piston or that surface. Oil chambers are formed at the two sides across the piston for moving the piston by the difference between the pressures thereof, so that the communication between the two oil chambers is shielded by the friction member when the friction member is sandwiched between the piston and that surface. In the surface adhering the friction member and/or the adhered surface of the friction member itself, moreover, there is formed a first groove which has an annular or arcuate shape extending in the circumferential direction of the friction member and which has communication such one of the two oil chambers as will take a lower pressure when the clutch is applied.

In the wet type clutch of the present invention, therefore, the groove for communicating with one oil chamber taking a lower pressure at the clutch applying time is formed in the surface adhering the porous friction member and/or the adhered surface of the friction member itself so that the portion closer to the lower pressure oil chamber than the groove takes substantially the same pressure as that in the lower pressure oil chamber. In other words, the pressure propagation from the oil chamber feeding the oil pressure for applying the clutch is blocked by that groove so that the so-called "reaction" acting in the direction to release the clutch is limited to the portion at the outer circumference side than the groove thereby to raise the clutch applying force relatively.

According to the present invention, a moreover, a second groove extending in the circumferential direction of the friction member in an annular or arcuate shape can be formed in the surface opposed to the adhered surface of friction member in the portion closer to the other oil chamber, which takes a higher pressure at the clutch applying time than the first groove. Still moreover, a communication hole for providing communication between the first groove and the groove can be formed in the friction member.

In case the second groove is formed, it acts as an oil reservoir for canceling the reaction to be caused by the oil flow resistance of the friction member at the side of the lower pressure oil chamber, i.e., the pressure acting in the direction to release the clutch. As a result, the clutch applying force is raised. If, on the other hand, the second groove is made either to communicate with the first groove at the side of the aforementioned adhered side or to overlap the same in the radial direction, the reaction caused by the oil flow resistance to the first groove in the adhered surface can be canceled more reliably to raise the clutch applying force more.

In another wet type clutch according to the present invention, a piston is arranged to move back and forth with respect to a countermember surface facing the piston, and a porous friction member is adhered to either the piston or that surface. Oil chambers are formed at the two sides across the piston for moving the piston by the difference between the pressures thereof, so that the communication between the two oil chambers is shielded by the friction member when the friction member is sandwiched between the piston and that surface. The portion of the friction member at the side of the oil chamber which takes a higher pressure at the clutch applying time either has its pores sealed or has a lower porosity rate than that of the portion at the side contacting with the other oil chamber.

With this construction, therefore, the higher pressure side of the friction member has its pores sealed or has a lower porosity rate so that the pressure for applying the clutch is made to reluctant to propagate into the porous friction member. As a result, the force for returning the piston is lowered to raise the pushing force for applying the clutch relatively.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

The present invention will be described in the following in connection with its embodiments, in which its wet type clutch is applied to a lockup clutch of a torque converter, with reference to FIGS. 1 to 15.

Figure 1:
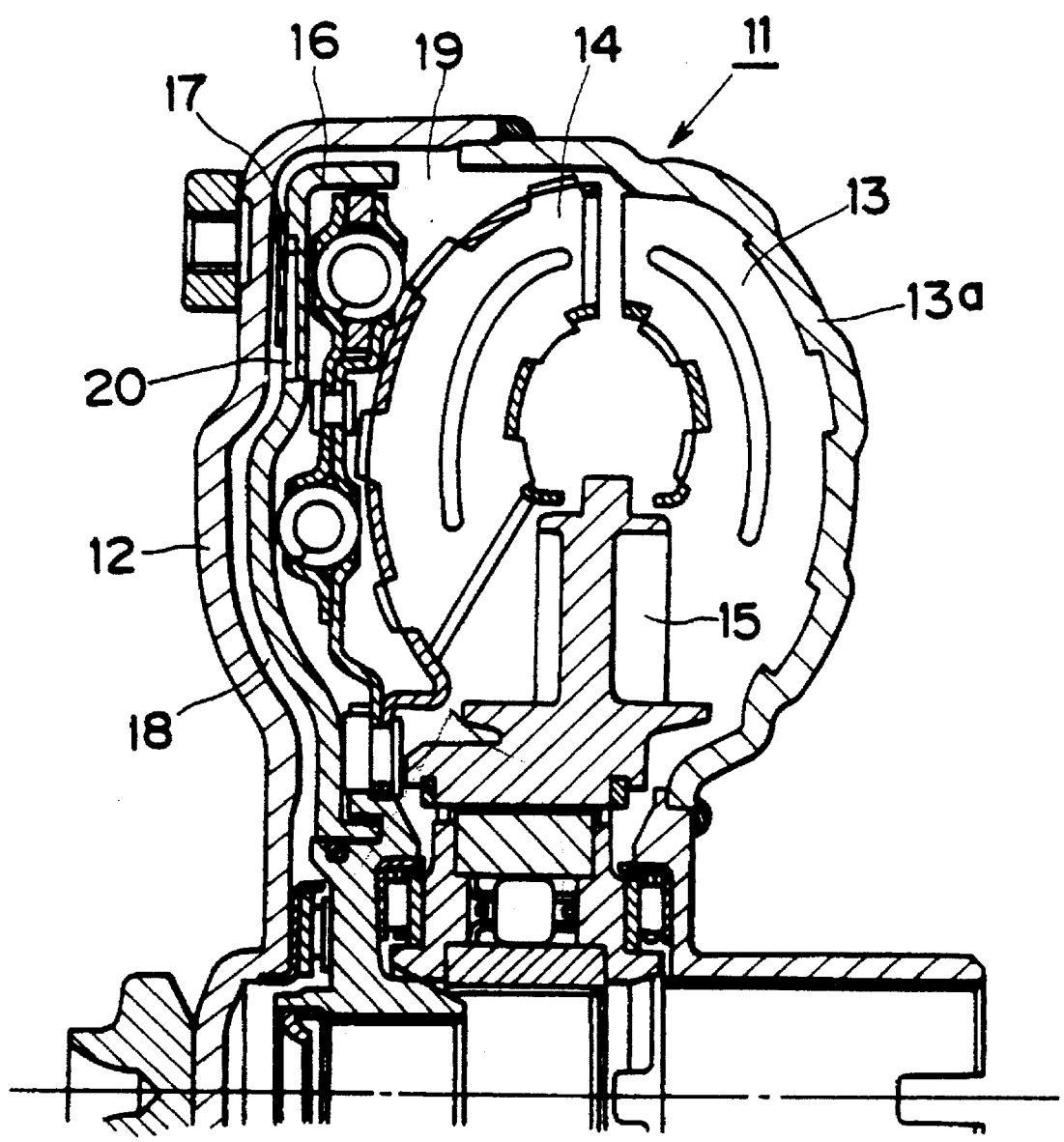
FIG. 1 is a partially omitted section showing a torque converter which is equipped with a lockup clutch according to a first embodiment of the present invention.
Figure 2:
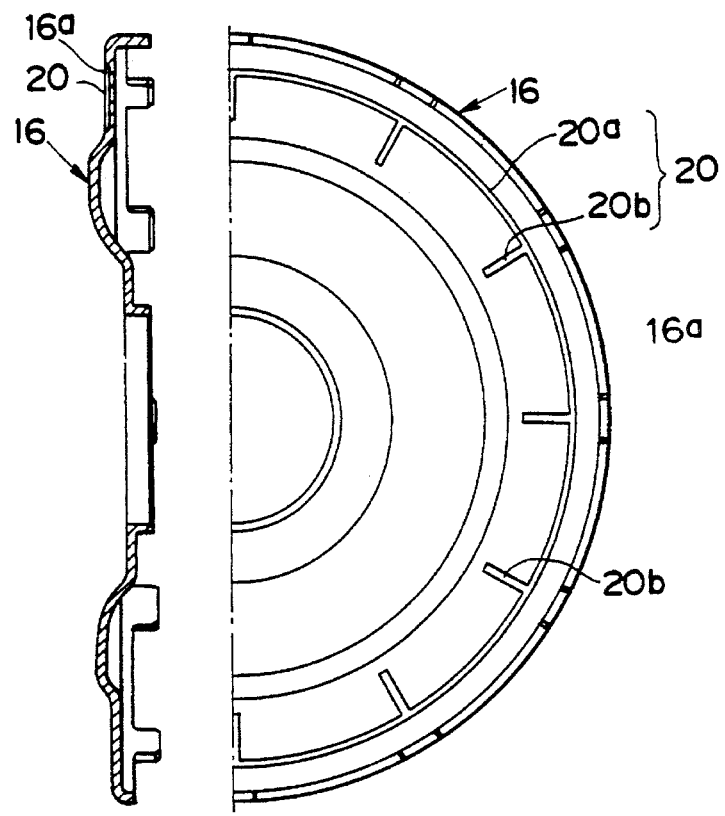
FIG. 2 presents a front elevation and a section showing a piston of the lockup clutch of the first embodiment.
Figure 3:
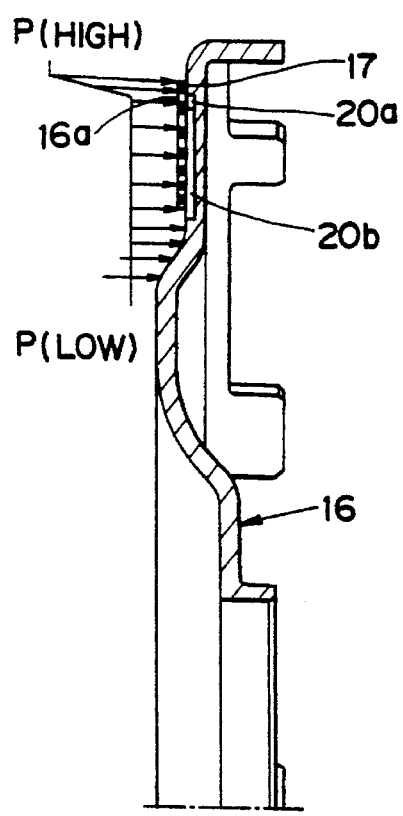
FIG. 3 is an enlarged section showing an essential portion of the piston shown in FIG. 2.

FIGS. 1 to 3 show a first embodiment of the present invention, in which a torque converter 11 has liquid-tight casing constructed of a front cover 12 and a shell 13a of a pump impeller 13. This casing is filled up with a fluid and arranged with a turbine runner 14, a stator 15 and a piston 16 of a lockup clutch. To the circumferential edge portion of the piston 16, as it faces the inner surface of the front cover 12 acting as a countermember, there is adhered a porous friction member 17 which has a constant width and an annular shape. This porous friction member 17 is prepared by impregnating a paper material with a synthetic resin and by hot-pressing to set the impregnated material. A first oil chamber 18 and a second oil chamber 19 are formed across the piston 16 at the respective sides of the front cover 12 and the turbine runner 14.

Moreover, that surface 16a on the circumferential edge portion of the aforementioned piston 16, to which is adhered the friction member 17, is formed with pressure reducing grooves 20, which are composed of an annular groove 20a around the center of the piston 16 and twelve radial grooves 20b. These radial grooves 20b are individually branched toward the center of the piston 16 from such positions as divide the annular groove 20a into twelve arcs. The friction member 17 is so adhered to the aforementioned surface 16a as to cover those pressure reducing grooves 20 while leaving the end portions of the individual radial grooves 20b open to the inner circumferential edge of the friction member 17.

Here will be described the actions of the torque converter which is equipped with the lockup clutch thus constructed. When the pump impeller 13 is rotated by the torque transmitted to the front cover 12 from an engine, the turbine runner 14 is driven by the helical flow of the fluid established by the pump impeller 13, to rotate the input shaft (although not shown) of a gear transmission mechanism splined to the turbine runner 14.

In the case of applying the lockup clutch, on the other hand, the oil pressure is fed to the second oil chamber 19 but is drained from the first oil chamber 18. As a result, the fluid is forced to flow from the second oil chamber 19 toward the first oil chamber 18 through the space between the piston 16 and the front cover 12. However, a pressure difference is established between the second oil chamber 19 and the first oil chamber 18 by the orifice effect between the friction member 17 and the front cover 12. As a result, the piston 16 is pushed toward the front cover 12 to bring its friction member 17 onto the inner surface of the front cover 12. Then, this friction member 17 seals up between the first oil chamber 18 and the second oil chamber 19 and isolates these oil chambers 18 and 19. The second oil chamber 19 to be fed with the fluid has its internal pressure raised whereas the first oil chamber 18 has its internal pressure lowered, to increase the internal pressure difference between the two oil chambers 18 and 19. As a result, the piston 16 has its friction member 17 pressed onto the front cover 12, to apply the lockup clutch. Then, the engine torque is transmitted directly to the input shaft of the gear transmission mechanism from the front cover 12 through the piston 16 so that the power loss, which might otherwise be caused by the relative slippage between the pump impeller 13 and the turbine runner 14, is eliminated.

At this time, the annular groove 20a and the radial grooves 20b communicating each other are formed on the surface 16a of the piston 16 having the annular friction member 17 adhered thereto, and the individual radial grooves 20b have their end portions communicating with the first oil chamber 18 which takes the lower pressure when the piston 16 is so forced into contact with the front cover 12 as to transmit the toque. Thus, even if the oil pressure at the side of the second oil chamber 19 propagates to the inside of the porous friction member 17 impregnated with the fluid, this pressure propagation is shielded by the portion of the annular groove 20a which has communication through the radial grooves 20b with the first oil chamber 18 under the lower pressure. This situation is illustrated in FIG. 3. As shown, the influences of the oil pressure at the side of the second oil pressure 19 are confined to the portion of the annular groove 20a so that the sum of the pressures P acting to return the piston 16 can be restricted to a small value.

Specifically, the force to return the piston 16 (i.e., the reaction), which is generated by the resistance to the oil flowing from the second oil chamber 19 under the higher pressure to the pressure reducing grooves 20 through the friction member 17, acts upon the portion of the piston 16 between the inner circumferential edge of the friction member 17 and the portion formed with the annular groove 20a. In addition, the reaction, which is generated by the oil pressure changing substantially linearly from the pressure in the second oil chamber 19 to the pressure in the portion of the annular groove 20a, acts upon the portion of the piston 16 between the portion formed with the annular groove 20a and the outer circumferential edge of the friction member 17. Of these, the reaction to act upon the portion formed with the reducing grooves takes a small value because the pressure in the same portion is as low as that in the first oil chamber 18. As a result, the reaction to act upon the piston 16, as generated by the oil pressure from the second oil chamber 19, that is, the force acting in the direction to release the piston 16 is lowered so that the force to apply the piston becomes relatively high.

In the case of releasing the lockup clutch, on the other hand, the oil pressure is fed to the first oil chamber 18 but drained From the second oil chamber 19. As a result, the piston is pushed away from the front cover 12 to bring its friction member 17 away from the front cover 12 so that the clutch is released to shut the torque transmission from the front cover 12 to the piston 16. In this state, the power is transmitted through the fluid.

Thus, with the construction described above, the lower pressure portion is established by the pressure reducing grooves 20 which are formed in the surface 16a of the piston 16 having the friction member 17 adhered thereto, so that the sum of the pressures P to act in the direction to return the piston 16 when the lockup clutch is applied can be suppressed to a small value to raise the apply pressure of the clutch relatively. In short, this lockup clutch can have its torque capacity increased, and the friction member 17 can have its surface fed with sufficient oil so that the undesired phenomenon "judder" can be prevented.

Figure 4:
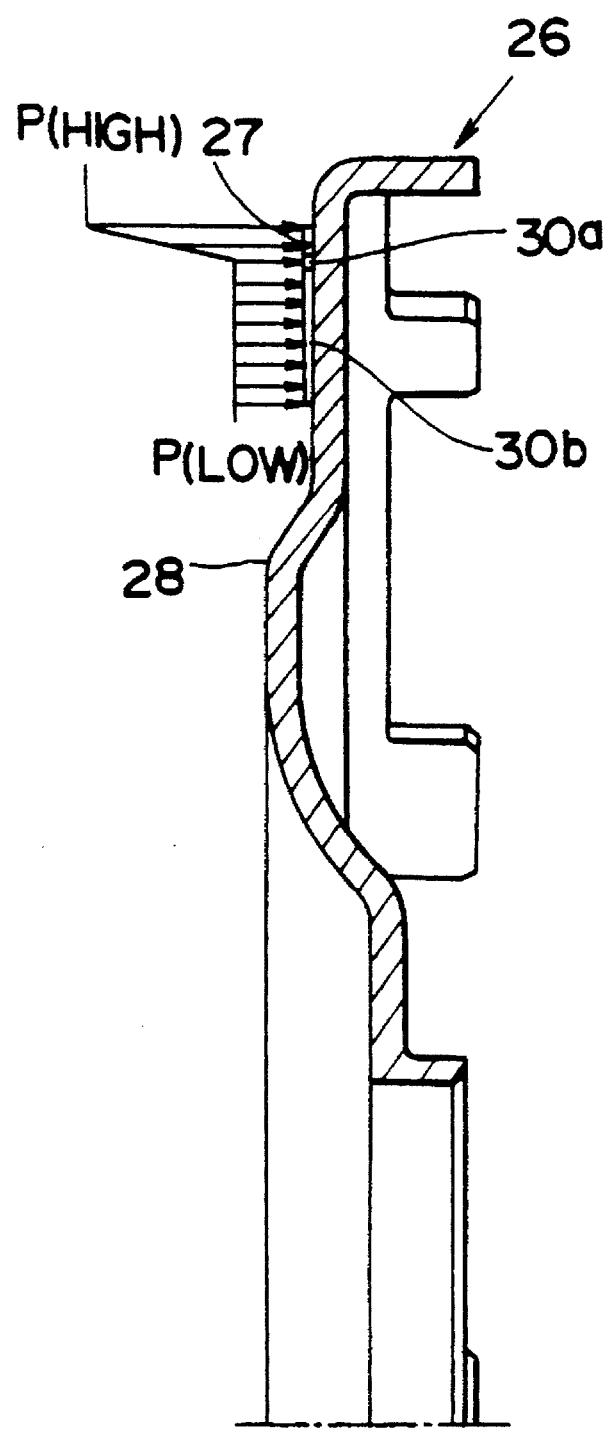
FIG. 4 is an enlarged section showing an essential portion of a piston of a lockup clutch according to a second embodiment.
Figure 5:
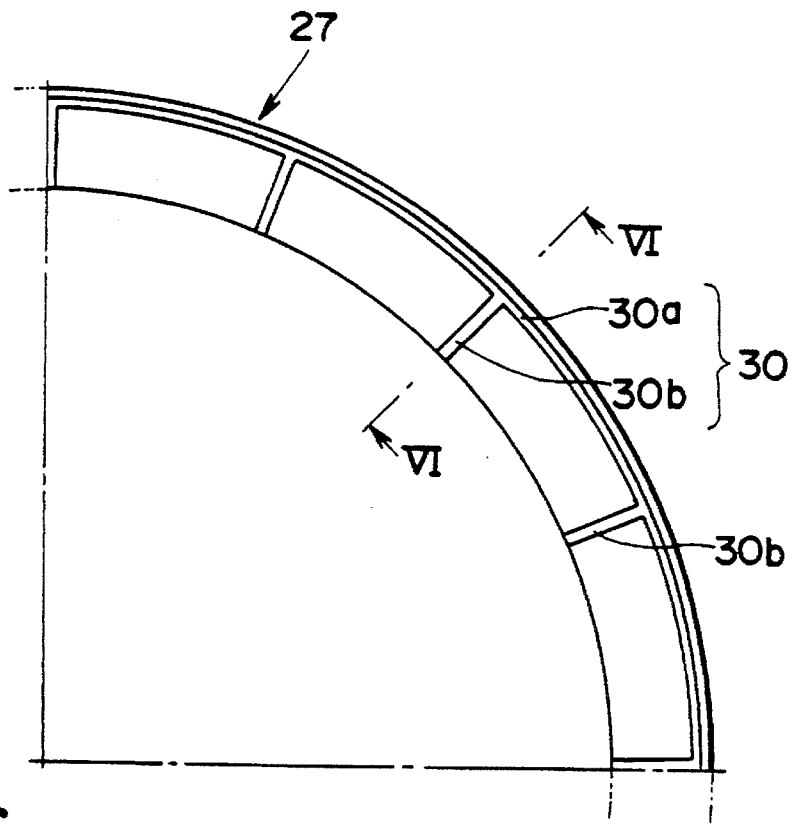
FIG. 5 is a partially omitted back elevation showing a friction member of the second embodiment.
Figure 6:
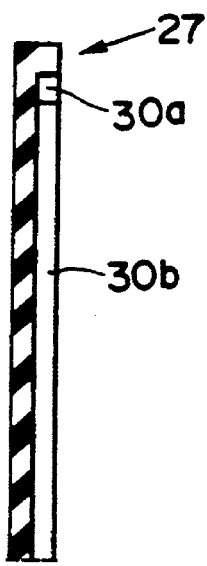
FIG. 6 is an enlarged section taken along line VI— VI of FIG. 5.

FIGS. 4 to 6 show a second embodiment of the present invention, in which an annular, porous friction member 27 has its adhered surface (i.e., its back) formed with pressure reducing grooves 30 composed of an annular groove 30a and radial grooves 30b. These pressure reducing grooves 30 take plate of the pressure reducing grooves 20 of the foregoing first embodiment, which are formed in the surface of the piston 16 and composed of the annular groove 20a and the radial grooves 20b. The pressure reducing grooves 30 will be described with reference to FIGS. 4 to 6.

To the front surface of a piston 26 for the lock-up clutch arranged in the torque converter, i.e., to the surface facing the inner surface of the (not-shown) front cover, there is adhered the friction member 27 which is made of a porous material to have a constant width and an annular shape.

This friction member 27 is molded by impregnating a paper material with a synthetic resin and by hot-pressing to set the impregnated material. At this molding time, as shown in FIG. 4, the friction member 27 is formed, at its surface to be adhered to the piston 26, i.e., at its back, simultaneously with the annular groove 30a extending along the outer circumferential edge thereof and the radial grooves 30b which are branched toward the center thereof from such positions as divide the annular groove 30a into sixteen arcs.

When the annular friction member 27 formed with the pressure reducing grooves 30 composed of the annular groove 30a and the radial grooves 30b is adhered to the surface of the piston 26, as located at the circumferential edge portion of the piston 26, the individual radial grooves 30b have their end portions communicating with a first oil chamber 28 which takes a lower pressure when the piston 26 is forced to contact with the front cover.

Thus, according to the construction shown in FIG. 4, the pressure acting in the direction to return the piston 26 when the lockup clutch is applied can be lowered at the portions of the pressure reducing grooves 30 so that actions and effects substantially identical to those of the foregoing first embodiment can be achieved.

Figure 7:
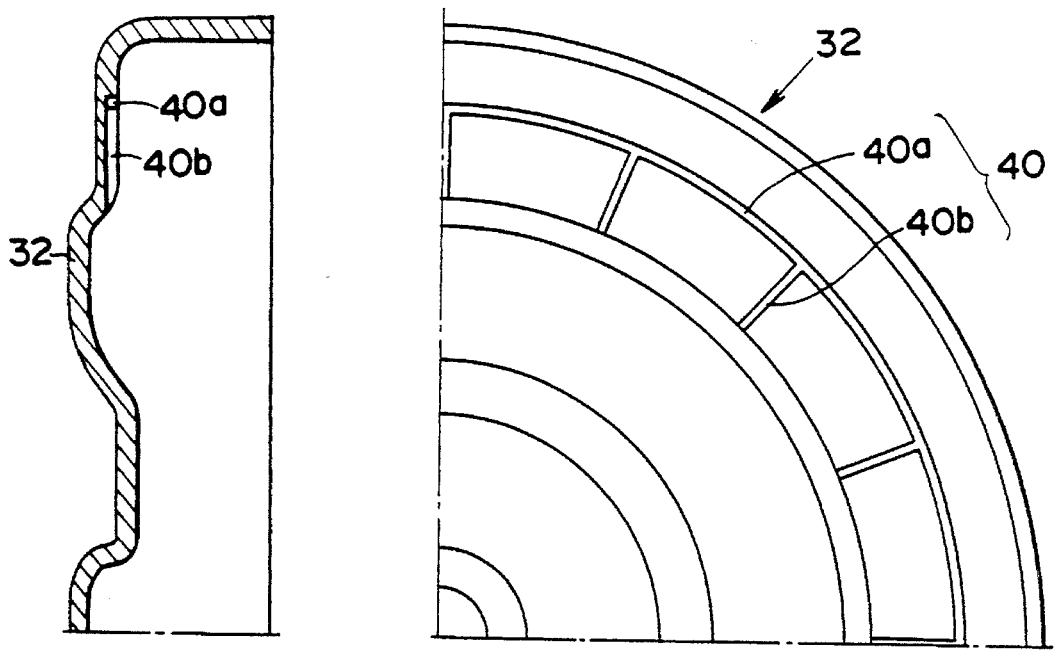
FIG. 7 presents a front elevation and a section showing a front cover of a lockup clutch according to a third embodiment.
Figure 8:
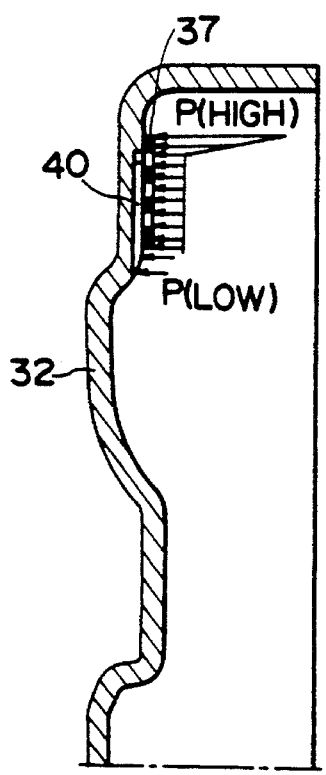
FIG. 8 is an enlarged section showing an essential portion of the front cover of the third embodiment.
Figure 9:
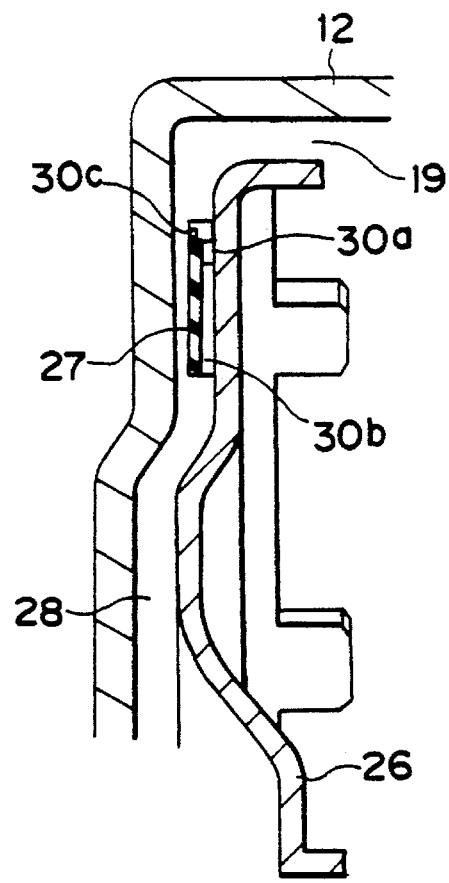
FIG. 9 is a section showing a portion of a fourth embodiment of the present invention.

FIGS. 7 and 8 show a third embodiment of the present invention. In this embodiment, the friction member is adhered not to the surface of the piston but to the inner surface of the front cover, i.e., the other member to be engaged by the piston, as will be specifically described in the following.

A front cover 32 covering the (not-shown) piston for the lockup clutch of the torque converter is formed in its inner surface with pressure reducing grooves 40 at its portion facing the piston. These pressure reducing grooves 40 are composed of an annular groove 40a, which extends along the outer circumferential edge of the inner surface of the front cover 32, and radial grooves 40b which are branched toward the center of the front cover 32 from such positions as divide the annular groove 40a into sixteen arcs. Moreover, a friction member is so adhered to the inner surface of the front cover 32 as to cover the pressure reducing grooves 40 while leaving the end portions of the individual radial grooves 40b open to the inner circumferential edge of the annular friction member 37.

When the lockup clutch is applied, the piston is pushed close to the front cover 32 by the fluid so that it is forced to contact with the friction member 37 adhered to the front cover 32. As a result, the input torque from the engine is transmitted directly to the (not-shown) input shaft of the gear transmission mechanism from the front cover 32 through the piston so that the power loss, which might otherwise be caused by the relative slippage between the pump impeller and the turbine runner, is eliminated.

At this time, the oil pressure propagates into the porous friction member 37 impregnated with the fluid to return the piston engaging with the front cover 32. However, this pressure propagation is substantially shielded at the portion of the pressure reducing portions 40, because the annular groove 40a formed in the front cover 32 has communication with the lower pressure side through the radial grooves 40b. As a result, the sum of the pressures P acting to return the piston is suppressed to a low value.

Thus, in the construction shown in FIGS. 7 and 8, the pressure distribution in the friction member 37 is set to a lower pressure state, as shown in FIG. 8, like the foregoing individual embodiments, by the pressure reducing grooves 40 formed in the surface of the front cover 32 having the friction member 37 adhered thereto. As a result, the pressure acting to return the piston 36 in the engaging state is reduced to raise the clutch applying pressure relatively so that an effect capable of increasing the torque capacity of the torque clutch can be achieved.

In this embodiment, moreover, the pressure reducing grooves 40 are formed at the side of the front cover 32 to form a lower pressure portion. However, this construction may be modified such that grooves similar to the pressure reducing grooves 40 are formed in the adhered surface of the friction member, which is adhered to the inner surface of the front cover 32, that is, to the surface contacting the inner surface of the front cover 32. This modified construction can also achieve the actions and effects substantially similar to those of the embodiment shown in FIGS. 7 and 8.

Incidentally, in the foregoing individual embodiments, the pressure reducing grooves 20, 30 and 40 are formed at one side of the friction members 17, 27 and 37, or the pistons 16 and 26 or the front cover 32 to which are adhered the friction members 17, 27 and 37. Despite of these constructions, however, those pressure reducing grooves may be formed in both the adhered surface of the friction member and the surface to engage with the friction member, or in only the surface to engage with the friction member.

In the foregoing individual embodiments, moreover, the propagation of the oil pressure in the friction member is substantially shielded by forming the annular grooves 20a, 30a and 40a so that the reaction at the inner circumferential side may be reduced. Thanks to the presence of those kind of grooves, the reaction to return the piston can be reduced. This reaction reducing effect can be achieved even if those individual annular grooves 20a, 30a and 40b are replaced by arcuate grooves which are not completely continuous in the circumferential direction. Thus, the present invention may be modified by replacing those annular grooves 20a, 30a and 40a by such arcuate grooves.

By forming the circumferential groove in the back, i.e., the adhered surface of the friction member, as described above, the oil pressure at the side (specifically, at the inner circumference of the friction member) closer to the lower pressure oil chamber than the groove can be reduced by the circumferential groove. On the other hand, the oil pressure at the side (specifically, at the outer circumference of the friction member) closer to the higher pressure oil chamber than the aforementioned groove so gradually lowers as to have a gradient shown in FIG. 8. This gradient is caused by the resistance to the oil flowing in the porous friction member toward the annular groove. However, the oil pressure at this portion pushes back the piston to release the lockup clutch so that the lockup clutch apply force is accordingly reduced.

Embodiments shown in FIGS. 9 to 12 are constructed to reduce even such releasing force at the outer circumferential side of the friction member, as called the "reaction". Specifically, the aforementioned friction member 27 is adhered to the front surface of the piston 26, i.e., the surface facing the front cover 12. This friction member 27 is formed, in its back, i.e., in its surface to be adhered to the piston 26, with the annular groove (or arcuate grooves) 30a extending in the circumferential direction and the plurality of straight radial grooves 30b branched radially inward from the annular groove 30a. On the other hand, the surface of the friction member 27 opposed to the aforementioned adhered surface is formed with another groove 30c which is located closer to the outer circumference of the aforementioned annular groove 30a. The additional groove 30c is exemplified by an annular groove (or arcuated grooves) which is concentric to the friction member 27. This second annular groove 30c has its bottom close to the first annular groove 30a at the back side in the embodiment shown in FIGS. 9 and 10. In the embodiment shown in FIG. 11, on the other hand, a communication hole 30d for providing communication between those annular grooves 30a and 30c is formed to equalize the internal pressures in the annular grooves 30a and 30c. In the example shown in FIG. 12, moreover, the second annular groove 30c is so extended to the outer circumferential side of the first annular groove 30a as to overlap the annular groove 30a in the axial direction.

The friction member 27 having the aforementioned second annular groove 30c is adhered to the piston 26 to construct the lockup clutch. When this lockup clutch is applied, the portion where the oil pressure is held at a predetermined or higher level by the oil flow resistance of the friction member 27 is limited to the outer circumferential portion than the second annular groove 30c so that the force for releasing the lockup clutch is reduced.

Figure 10:
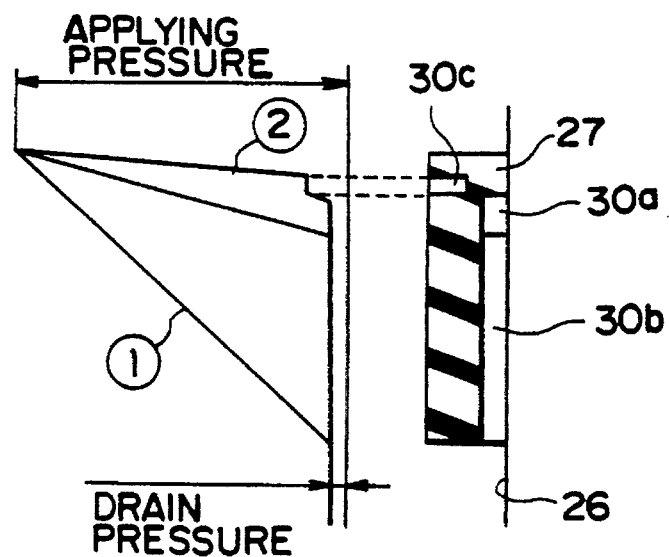
FIG. 10 is a diagram showing a section and a pressure distribution of a friction member of the fourth embodiment.

This will be described in more specific manner. FIG. 10 additionally illustrates the pressure distribution at the radial positions in the radial direction of the friction member 27. The oil pressure in the zone, as indicated by circled numeral ①, is eliminated because the annular groove 30a takes a pressure equal to the oil pressure (i.e., drain pressure) of the first oil chamber 18. Moreover, the pressure difference between the second annular groove 30c and the first annular groove 30a is limited to the oil flow resistance due to the friction member 27 between those grooves 30c and 30a so that it takes a small value. As a result, the oil pressure in the zone, as indicated by circled numeral ②, is eliminated. In short, in the embodiment shown in FIGS. 9 and 10, the reaction to be established by the oil pressure in the zone ②, that is, the force in the direction to release the lockup clutch is eliminated by providing the second annular groove 30c, so that the pressure for applying the lockup clutch is accordingly raised.

Figure 11:
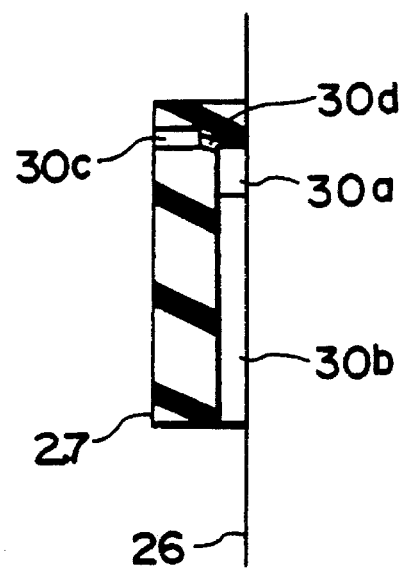
FIG. 11 is a section showing a portion of a friction member for explaining a fifth embodiment of the present invention.
Figure 12:
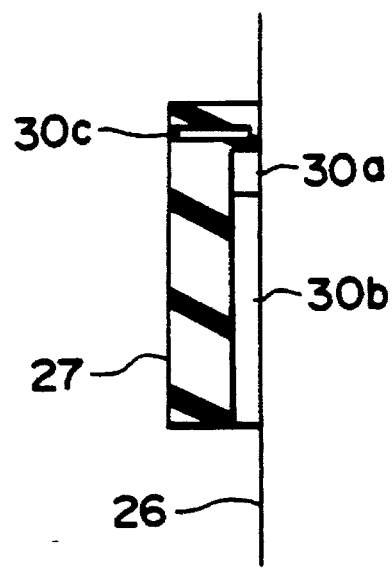
FIG. 12 is a section showing a portion of a friction member for explaining a sixth embodiment of the present invention.
Figure 13:
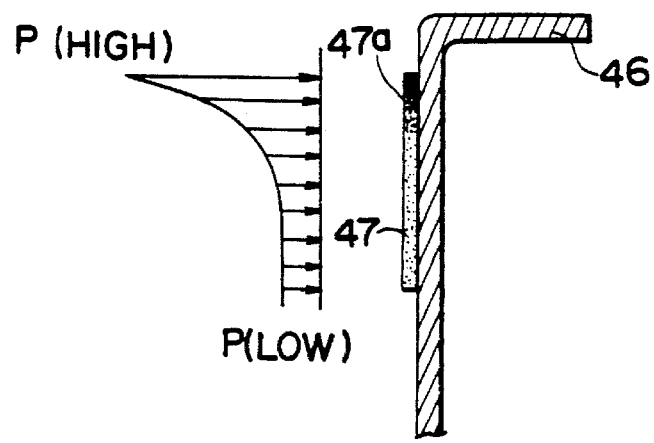
FIG. 13 is a schematic diagram showing a section of a friction member of a lockup clutch according to a seventh embodiment of the present invention and a pressure distribution when the lockup clutch is applied.

In the embodiment shown in FIG. 11, moreover, thanks to the communication hole 30d, the oil pressure resistance between the second annular groove 30c and the first annular groove 30a and the reaction to be established by the oil flow resistance can be eliminated to increase the lockup clutch apply force to a higher level. In the embodiment shown in FIG. 12, moreover, the oil flow resistance between the second annular groove 30c and the first annular groove 30a can be lowered to reduce the reaction due to the oil flow resistance thereby to increase the lockup clutch apply force.

Here will be described the remaining embodiments of the present invention. In the embodiment shown in FIG. 13, a porous friction member 47 is made to have its porosity rate changed in the radial direction. More specifically, the friction member 47 adhered to a lockup clutch piston 46 is hot-pressed and set such that its portion (as located at the upper portion of FIG. 13) for providing the higher pressure oil chamber when the clutch is applied has a higher resin content. As a result, this portion 47a having the higher resin content has the lower porosity rate so that it can be given the higher oil flow resistance to suppress the pressure propagation to the inner circumferential side. Thus, the pressures P acting to return the piston 46, when this piston 46 comes into engagement with the (not-shown) front cover, are distributed, as indicated by arrows in FIG. 13, so that their sum is lower than that of the case, in which the ordinary porous friction member is used, to increase the apply force and according the transmission torque capacity of the lockup clutch. Moreover, the frictional surface is fed with sufficient oil so that the surface of the friction member 47 can have its coefficient of friction stabilized to prevent the judder.

Figure 14:
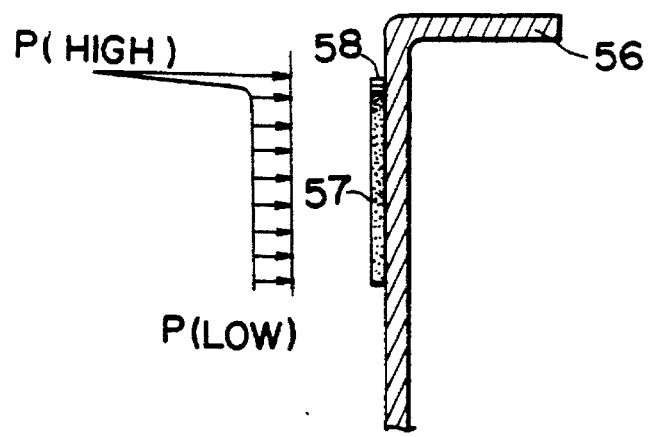
FIG. 14 is a schematic diagram showing a section of a friction member of a lockup clutch according to an eighth embodiment of the present invention and a pressure distribution when the lockup clutch is applied.

On the other hand, an embodiment shown in FIG. 14 is constructed such that the fluid is prevented from penetrating into the friction member from the higher pressure oil chamber side when the lockup clutch is applied. Specifically, a porous friction member 57 is adhered to that surface of a lockup clutch piston 56, which faces the (not-shown) front cover. A sealing medium 58 for sealing the pores of the porous friction member 57 is applied at such an end portion (as located at the upper end portion of FIG. 14) of the friction member 57 as belongs to the side of the higher pressure oil chamber when the clutch is applied.

Thus, the friction member 57 has its pores sealed up at the outer circumferential edge so that the pressure propagation from the higher pressure oil chamber into the friction member 57 is prevented. As a result, the pressure distribution in the friction member 57 takes a pressure level substantially equal to the pressure at the side of the lower pressure oil chamber, as indicated by arrows in FIG. 14. Then, the sum of the pressures P acting to return the piston 56 is far lower than that of the case in which the ordinary friction member is used, so that the force for applying the lockup clutch is raised to increased the transmission torque capacity.

Figure 15:
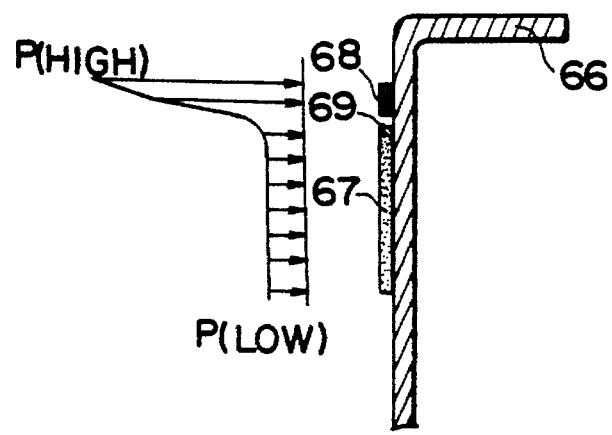
FIG. 15 is a schematic diagram showing a section of a friction member of a lockup clutch according to a ninth embodiment of the present invention and a pressure distribution when the lockup clutch is applied.
Figure 16:
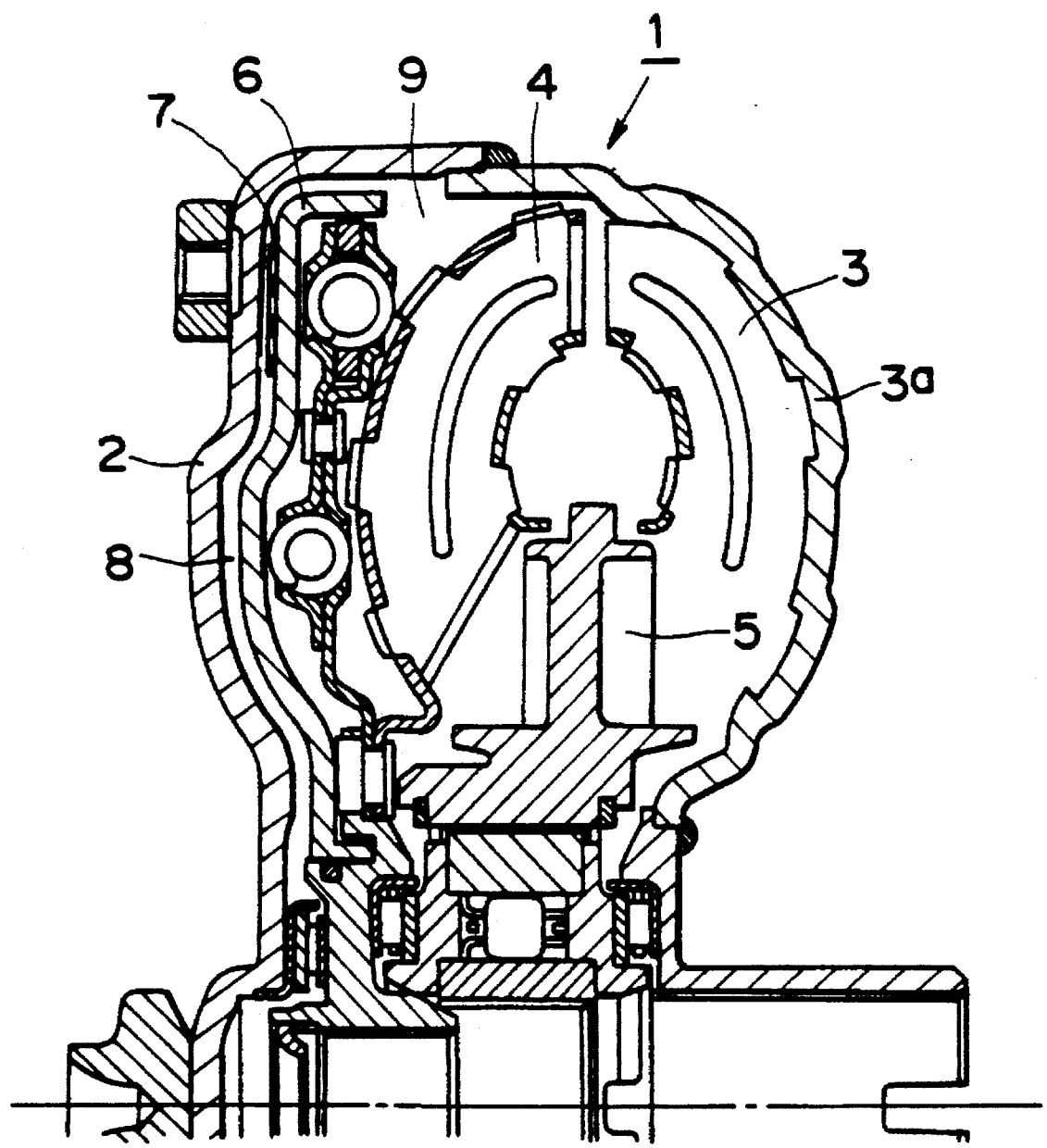
FIG. 16 is a partially omitted section showing a torque converter which is equipped with the lockup clutch of the prior art.
Figure 17:
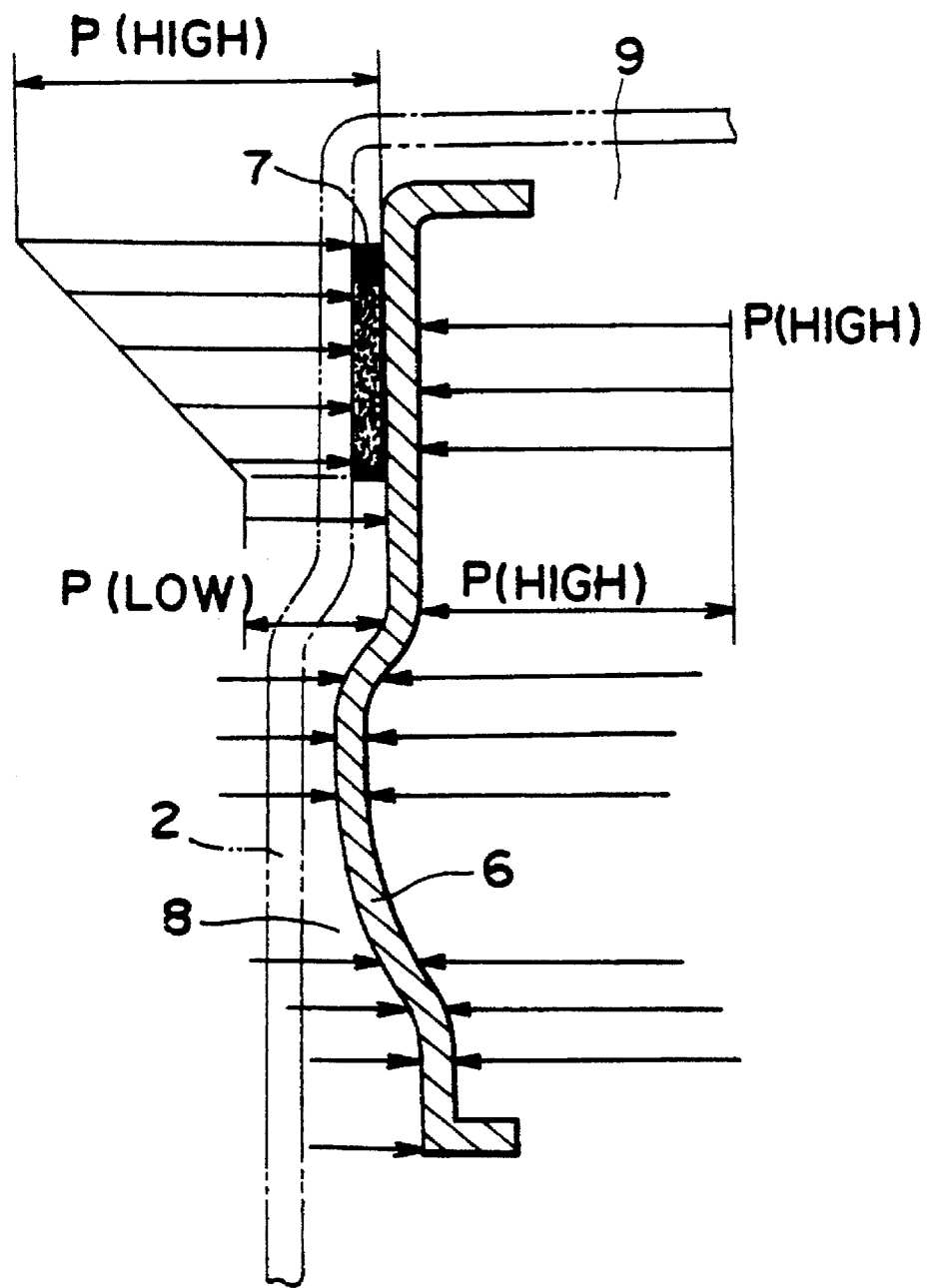
FIG. 17 is a schematic diagram showing the distributions of the oil pressures to act upon the two surfaces of a piston when the lockup clutch of the prior art is applied.

A further embodiment shown in FIG. 15 is exemplified by using two kinds of friction members having different porosity rates. Specifically, the friction members used to be adhered to that surface of a piston 66, which faces the (not-shown) front cover, are a porous friction member 67 having an ordinary porosity rate and a porous friction member 68 having a smaller porosity rate but made as thick as the former friction member 67. Of these, the former friction member 67 is adhered to the portion (as located at the upper portion in FIG. 15) at the higher pressure oil chamber side when the clutch is applied, and the latter friction member 68 is so adhered to the portion around the former friction member 67 as to form an grooved space 69 in an annular form.

According to the structure shown in FIG. 15, therefore, the less porous friction member 68 blocks the pressure propagation from the higher pressure oil chamber (as located at the higher portion in FIG. 15), and the grooved space 69 forms a lower pressure portion for further blocking the pressure propagation. As a result, the pressure at the lower friction member 67 of FIG. 15 becomes substantially equal to the oil pressure in the lower pressure oil chamber, as indicated by arrows in FIG. 15, when the lockup clutch is applied. Thus, the sum of the pressures P acting to return the piston 66 becomes far lower than that of the case in which the aforementioned ordinary friction member is used, so that the apply force is raised to increase the transmission torque capacity of the lock-up clutch.

Incidentally, in the embodiments shown in FIGS. 9 to 12, the friction member, which is adhered to the piston and which has its its adhered surface formed with the pressure reducing grooves, is formed with the additional annular groove (or arcuate grooves) 30c. However, the so-called "surface groove 30c" of this kind can also be formed in the friction member 17 of the construction shown in FIG. 3 or the friction member 37 of the construction shown in FIG. 8. In the present invention, moreover, the annular grooves, as exemplified in the foregoing individual embodiments, can also be replaced by arcuate grooves having a constant length. In this modification, these individual arcuate grooves may preferably be made symmetric with respect to the center of the piston so as to prevent the piston apply force from being offset. Still moreover, the foregoing individual embodiments have been described in case the present invention is applied to the lockup clutch of the torque converter, but the present invention can also be suitably applied to other wet type clutches.

The advantages to be obtained in the present invention will be synthetically described in the following. According to the present invention, in the wet type clutch in which the higher pressure oil chamber and the lower pressure oil chamber communicate with each other through the porous friction member and in which the piston is brought into engagement by the pressure difference between those oil chambers, the friction member is formed in its adhered surface, i.e., its non-engage surface with the annular groove or arcuate grooves extending in the circumferential direction and communicating with the lower pressure oil chamber. As a result, the pressure propagation to be caused by the fact that the fluid penetrates into the porous friction member is shielded at the portion of the groove or grooves. Thus, the pressure in the friction member is far lower in the power closer to the lower pressure oil chamber than the groove or grooves than the pressure without the groove or grooves, so that the so-called "reaction" acting to return the piston can be lowered to raise the clutch apply pressure. In case, on the other hand, the friction member is formed with the additional groove in the position closer to the higher pressure oil chamber than the former groove or grooves, this second groove can also shield the pressure propagation to lower the aforementioned reaction additionally.

Furthermore, if the friction member is exemplified by using the construction in which the pores at the portion to belong to the higher pressure oil chamber when the clutch is applied are sealed or in which the porosity rate is made lower than that at the side to contact with the other oil chamber, the pressure acting to release the clutch can be lowered to raise the apply force relatively thereby to increase the transmission torque capacity of the clutch.

What is claimed is:

1. A wet type clutch comprising:

a countermember;

a piston arranged to move back and forth with respect to said countermember;

a porous friction member adhered to one of said piston and said countermember;

oil chambers formed at opposite sides of said piston by a difference between the pressures in said chambers, wherein communication between said oil chambers is shielded by said friction member when said friction member is sandwiched between said piston and said countermember;

a first groove formed on one of a surface for adhering said friction member and an adhered surface of said friction member, said piston and said countermember, said first groove facing a surface of said friction member and extending in an annular or arcuate shape in the circumferential direction of said friction member and which communicates with one of said oil chambers having a lower pressure when said clutch is applied.

2. A wet type clutch according to claim 1, further comprising a second groove formed in said friction member, and extending in the circumferential direction on said friction member over a predetermined range in an annular or arcuate shape, and formed on a portion of said friction member closer to the other oil chamber to take a higher pressure when said clutch is applied than said first groove.

3. A wet type clutch according to claim 2, further comprising a communication hole formed on the friction member for providing communication between said first groove and said second groove.

4. A wet type clutch according to claim 2, wherein said first groove is formed in a surface of said friction member which is adhered to one of said piston and said countermember, and wherein said second groove is made so deep as to overlap said first groove in the axial direction of said friction member.

5. A wet type clutch according to claim 1, wherein said countermember comprises a front cover facing said piston and a pump impeller shell integrated with said front cover for accommodating said piston, wherein said piston is arranged to move close to and apart from said front cover, and wherein said friction member is adhered to the surface of said piston facing said front cover.

6. A wet type clutch according to claim 5, wherein said friction member is adhered to a surface of said piston and the surface of said piston having said friction member adhered thereto is formed with said first groove.

7. A wet type clutch according to claim 5, wherein said first groove is formed in the surface of said friction member adhered to said piston.

8. A wet type clutch according to claim 7, further comprising a second groove in a surface of said friction member opposite said adhered surface, which second groove extends in the circumferential direction on said friction member over a predetermined range in an annular or arcuate shape, and which is formed on a portion of said friction member closer to the oil chamber which takes a higher pressure when said clutch is applied than is said first groove.

9. A wet type clutch according to claim 8, further comprising a communication hole formed on said friction member for providing communication between said first groove and said second groove.

10. A wet type clutch according to claim 8, wherein said first groove is formed in the adhered surface of said friction member, and wherein said second groove is made so deep as to overlap said first groove in the axial direction of said friction member.

11. A wet type clutch according to claim 1, wherein said countermember comprises a front cover facing said piston and a pump impeller shell integrated with said front cover for accommodating said piston, wherein said piston is arranged to move close to and apart from said front cover, and wherein said friction member is adhered to the surface of said front cover facing said piston.

12. A wet type clutch according to claim 11, wherein said friction member is adhered to a surface of said piston and the surface of said front cover having said friction member adhered thereto is formed with said first groove.

13. A wet type clutch comprising:

a countermember;

a piston arranged to move back and forth with respect to said countermember;

a porous friction member having a multiplicity of pores and adhered to one of said piston and said countermember;

oil chambers formed at sides of said piston for moving said piston by the difference between the pressures in the oil chambers, wherein communication between the oil chambers is shielded by said friction member when said friction member is sandwiched between said piston and said surface; and suppress means for suppressing propagation of the oil pressure from the oil chamber having a higher pressure to that portion of said friction member which is located adjacent said higher pressure oil chamber when said clutch is applied, wherein said suppress means includes a sealing medium applied to the circumference of said friction member adjacent said higher pressure oil chamber.

14. A wet type clutch according to claim 13, wherein said countermember comprises a front cover facing said piston and a pump impeller shell integrated with said front cover for accommodating said piston, wherein said piston is arranged to move close to and apart from said front cover, and wherein said friction member is adhered to the surface of said piston facing said front cover.

15. A wet type clutch according to claim 14, wherein said suppress means includes a sealing medium applied to the circumference of said friction member adjacent said higher pressure oil chamber.

16. A wet type clutch according to claim 14, wherein said suppress means includes a portion of said friction member located at the side of said higher pressure oil chamber and having a lower porosity rate than that of the remaining portion.

17. A wet type clutch according to claim 14, wherein said friction member comprises a first fiction member and said suppress means includes another friction member of a lower porosity rate than that of the first friction member and arranged adjacent said higher pressure oil chamber.

18. A wet type clutch comprising:

a countermember;

a piston arranged to move back and forth with respect to said countermember;

a porous friction member having a multiplicity of pores and adhered to one of said piston and said countermember;

oil chambers formed at sides of said piston for moving said piston by the difference between the pressures in the oil chambers, wherein communication between the oil chambers is shielded by said friction member when said friction member is sandwiched between said piston and said surface; and suppress means for suppressing propagation of the oil pressure from the oil chamber having a higher pressure to that portion of said friction member which is located adjacent said higher pressure oil chamber when said clutch is applied, wherein said suppress means includes a portion of said friction member located adjacent said higher pressure oil chamber and having a lower porosity rate than that of the remaining portion of said friction member.

19. A wet type clutch comprising:

a countermember;

a piston arranged to move back and forth with respect to said countermember;

a porous friction member having a multiplicity of pores and adhered to one of said piston and said countermember;

oil chambers formed at sides of said piston for moving said piston by the difference between the pressures in the oil chambers, wherein communication between the oil chambers is shielded by said friction member when said friction member is sandwiched between said piston and said surface; and suppress means for suppressing propagation of the oil pressure from the oil chamber having a higher pressure to that portion of said friction member which is located adjacent said higher pressure oil chamber when said clutch is applied, wherein said friction member comprises a first friction member and said suppress means includes a second friction member of a lower porosity rate than that of the first friction member and arranged adjacent said higher pressure oil chamber and spaced from a circumference of said first friction member.

* * * * *